United States Patent [19]
Christ

[11] 3,753,731
[45] Aug. 21, 1973

[54] PROCESS AND APPARATUS FOR FERMENTATION

[76] Inventor: Charles Christ, 65 rue de Paris, Connerre, France

[22] Filed: Mar. 16, 1971

[21] Appl. No.: 124,711

[52] U.S. Cl.................. 99/103, 99/156, 99/472, 195/126, 195/144
[51] Int. Cl............... A23l 1/00, A23b 7/00
[58] Field of Search................ 99/156, 186, 100 R, 99/103, 31, 32, 472; 195/144, 104, 107

[56] References Cited
UNITED STATES PATENTS
3,528,817  9/1970  Barrett et al............. 99/31
2,804,010  8/1957  Knauble.................. 99/271

Primary Examiner—Alvin E. Tanenholtz
Assistant Examiner—R. B. Penland
Attorney—Burgess, Ryan & Wayne

[57] ABSTRACT

The present invention concerns a process and apparatus for fermentation in a vacuum. The apparatus is useful in the fermentation of a mass, specifically, the fermentation of vegetables such as cabbage, the apparatus consisting of an air-tight container, preferably suitable for storage on a pallet, and equipped with means of creating a vacuum therein.

1 Claim, 1 Drawing Figure

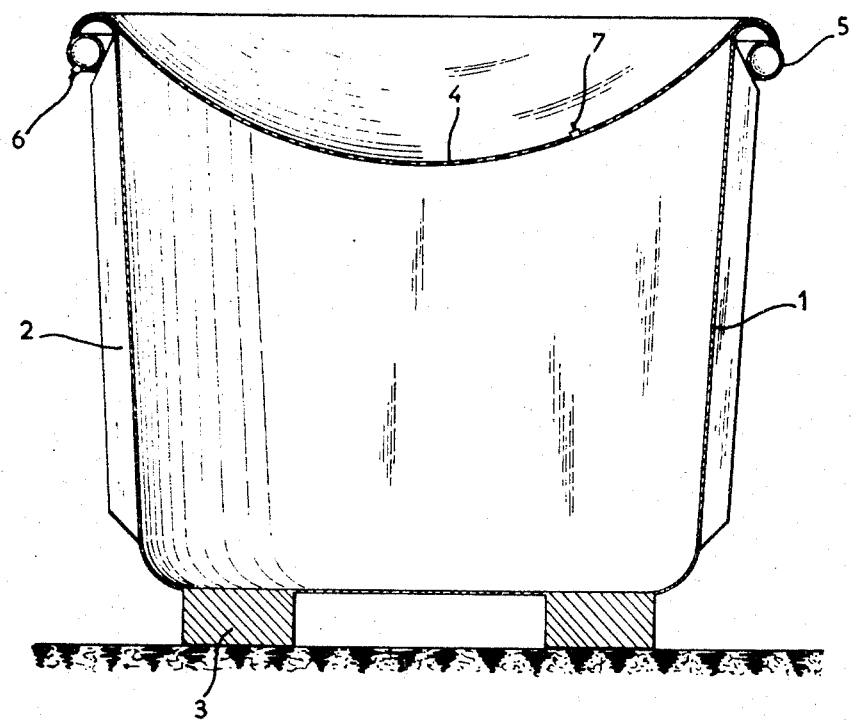

PROCESS AND APPARATUS FOR FERMENTATION

DESCRIPTION OF THE INVENTION

The present invention relates generally to a process and apparatus for fermentation in a vacuum, and the particular application to the fermentation of sauerkraut.

Existing fermentation techniques, and notably lactic fermentation techniques, do not comply adequately with hygienic requirements for the fermentation of substances intended for human consumption. Such existing techniques also do not adequately prevent or minimize pollution of the environment, or pollution of the fermenting product by the environment. In addition, such techniques are generally inefficient and the resulting product is characterized by inferior quality.

The present invention concerns a fermentation process which keeps the product free from contact from the atmosphere, does not pollute the environment, and ensures a maximum output, without any wastage or reduction of efficiency.

The present invention concerns a fermentation process, for example the fermentation of a mass of vegetables or other matter, in particular cabbage to obtain sauerkraut. In the process, the fermentation takes place free from contact with the air, in an enclosed container in which a vacuum is first created, and is placed in a room with adjustable temperature.

The present invention also concerns an apparatus for the fermentation of a mass. This apparatus includes an airtight container, preferably suitable for storage on a pallet, which is equipped with means of creating a vacuum inside it.

According to one embodiment of the present invention, the container consists of an airtight vat, at least a part of one side of which, and preferably the lid, is made of a flexible membrane.

According to one embodiment of the invention, the aforesaid flexible membrane is attached to the vat by an inflatable tubing thereby insuring the airtightness of the vat.

According to another embodiment of the invention, the container includes separate inflatable materials which exert pressure on the mass contained in the vat, said inflatable materials being inflated as the vacuum is created inside the container.

According to yet another embodiment of the invention, the appliance used to create a vacuum inside the container consists of a valve which can be connected to a vacuum pump.

According to another embodiment of the invention, the container is made from a durable, rotproof material and includes strengthening ribs.

According to another embodiment of the invention, the inflatable materials and a membrane which are non-toxic, are therefore suitable for use with foodstuffs.

According to yet another embodiment of the invention, the vats can be stored on pallets and can be superimposed on one another.

The present invention also concerns an apparatus for the lactic acid fermentation of a mass of food products such as vegetables or other products and is particularly concerned with the fermentation of cabbage to produce sauerkraut.

It will be easier to understand the invention from the detailed description below and from the accompanying FIGURE, which represents one embodiment of the invention. It will be obvious that modifications can be made and consequently, the invention should not be restricted to this embodiment.

The FIGURE shows a vat 1 made of laminated polyester, with strengthening ribs 2. The vat rests on the ground on legs 3, which take up only part of the base so that a pallet can be inserted beneath it. A flexible membrane 4, of rubber approved for use with foodstuffs, covers the vat, and an inflatable tubing 5, which is joined to the membrane, ensures that the vat is airtight. This tubing can be inflated through the valve 6, while a vacuum can be created in the vat by attaching a vacuum pump (not shown here) to the valve 7. The tubing 5 is inflated as the air is being pumped out of the vat thereby insuring airtightness.

Naturally, the inflatable tubing 5 can be replaced by any other means of insuring airtightness around the flexible membrane 4.

The cabbage or other vegetables to be fermented are placed in the vat 1, which is then covered with the flexible membrane 4. The tubing 5 is inflated and simultaneously, a vacuum is created in the vat by attaching a vacuum pump (not shown here) to the valve 7 and pumping the air out of the vat 1.

The vat can then be placed on a pallet and conveyed to a room which is maintained at a temperature suitable for conducting the fermentation. If necessary, the vats can be stacked on top of one another.

When fermentation is complete, said fermentation having been effected in the absence of air, the vacuum is released, the membrane is removed, and the vat is then emptied.

This method ensures greater cleanliness, and avoids wastage through handling.

The invention is naturally in no way restricted to the embodiment described and illustrated here; many variations will be obvious to a person skilled in the art depending on the applications involved, and without any departure from the spirit of the invention.

For instance, it is possible not only to create a vacuum in the vat filled with vegetables, but, instead of making use just of the pressure of the surrounding air on the membrane 4 when the vacuum has been created, to provide separate inflatable materials inside the vat, which will also exert pressure on the contents of the container as they are inflated during the pumping-out of the air in it. These materials will be made of non-toxic substances which are approved for use with foodstuffs.

By "approved for use with foodstuffs" is meant that the material in question complies with the standards laid down for any material that is to come into contact with foodstuffs. The vegetables referred to include not only cabbage but other vegetables such as gherkins and in particular, mixed vegetable salads.

I claim:

1. A fermentation process for fermentation of a mass of vegetables comprising
   placing the vegetables in a vat having an upper end opening;
   covering the opening with a flexible membrane;
   developing an airtight connection between the end opening and the flexible membrane by joining the membrane to inflatable tubing and positioning the tubing around the outside of the end opening;

forming a vacuum in the vat between the membrane and the vegetables by pumping out the air therein;

inflating the tubing simultaneously with the vacuum pumping to establish the airtight connection;

maintaining the vat at a predetermined temperature for fermentation while the suction is applied; and releasing the vacuum and inflation of the tubing to remove the membrane when the fermentation is complete.

* * * * *